June 8, 1971        A. R. JACCARD        3,583,025
MEAT TENDERIZING APPARATUS
Filed Oct. 31, 1968        2 Sheets-Sheet 1
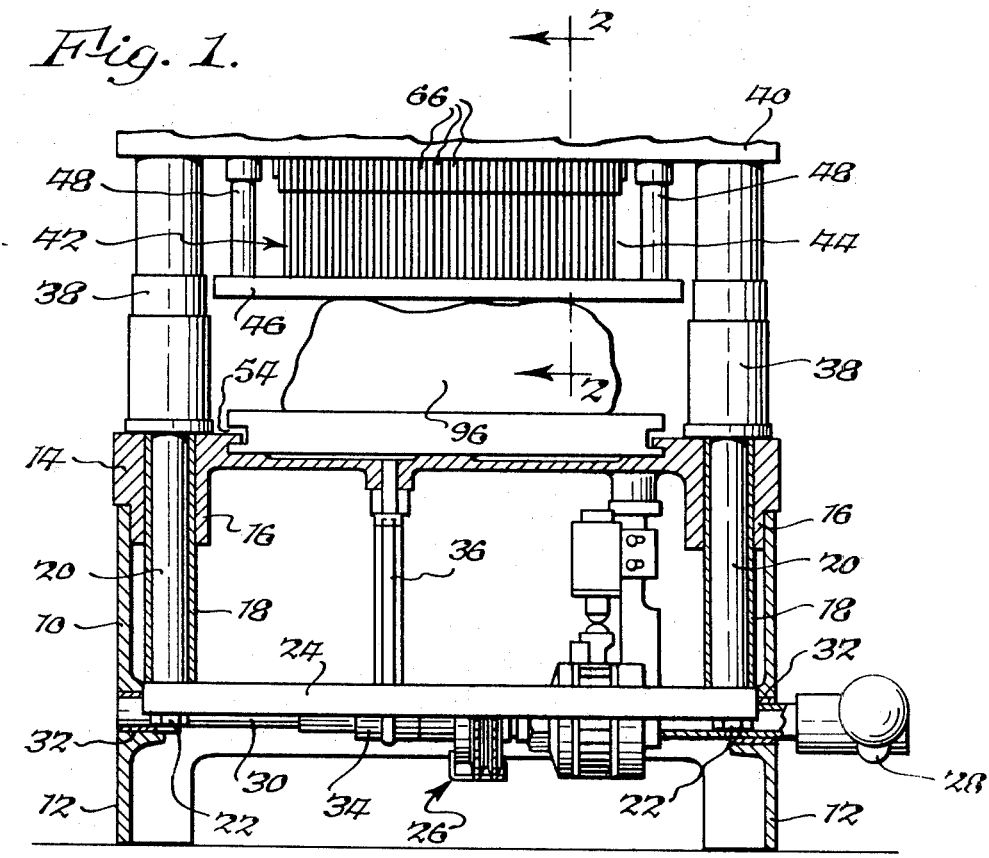
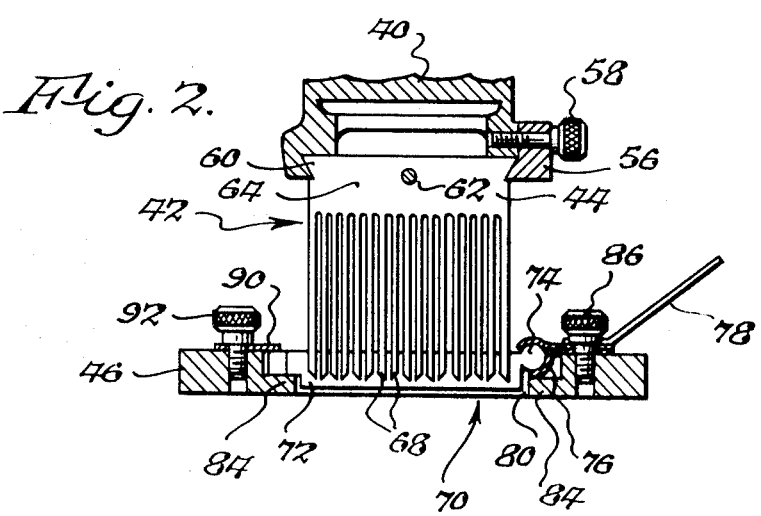
INVENTOR.
Andre R. Jaccard
BY
Ashlan F. Harlan Jr.
ATTORNEY.

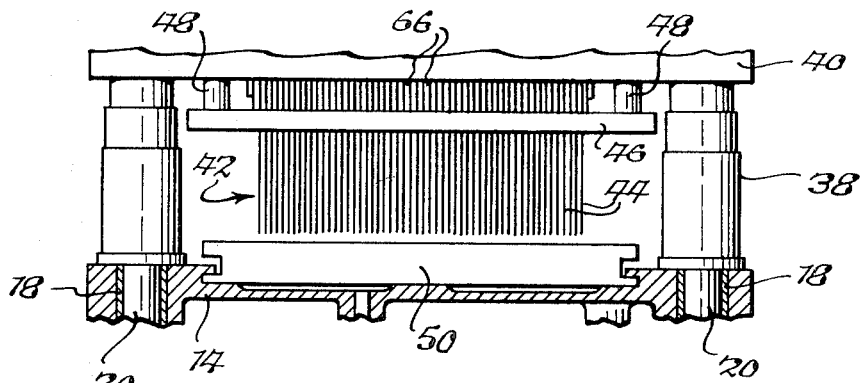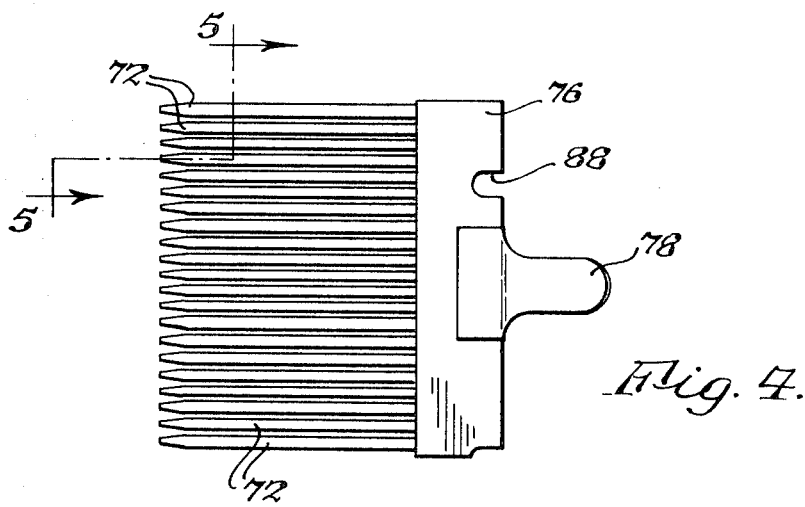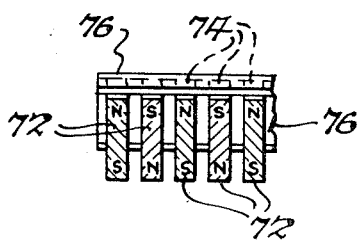

United States Patent Office 3,583,025
Patented June 8, 1971

3,583,025
MEAT TENDERIZING APPARATUS
Andre Robert Jaccard, Buffalo, N.Y., assignor to Jaccard Corporation, New York, N.Y.
Filed Oct. 31, 1968, Ser. No. 776,851
Int. Cl. A22c 9/00
U.S. Cl. 17—25                                                8 Claims

ABSTRACT OF THE DISCLOSURE

Magnetic guide bars are used in meat tenderizing apparatus in which one or more long blades make a plurality of incisions in a cut of meat, said bars holding said blades firmly but yieldingly in proper position by their mutual magnetic attraction.

BACKGROUND OF THE INVENTION

The present invention relates to meat tenderizing apparatus.

The problem of tenderizing meat so that it may be easily chewed is an old one. Aside from various chemical methods for rendering meat tender, apparati of many types have been developed for this purpose. One such apparatus is disclosed in Tamain U.S. Pat. No. 3,283,360, granted Nov. 8, 1966. In the machine of the patent a plurality of long, thin, knife blades are forced repeatedly into a cut of meat, thus making a large number of incisions and severing the tough connective tissue in the meat at many places, thereby making the meat tender. Because of the length and thinness of the blades, a guide is necessary to maintain the knives in aligned and properly spaced position during use. Such a guide is provided by the use of a plurality of parallel guide bars, the blades being located between the bars and held in position thereby.

SUMMARY OF THE INVENTION

The present invention provides an improvement on the blade guide structure disclosed in the above-mentioned patent, the improvement consisting in forming the guide bars, between which the knife blades are held for reciprocation, of magnetic material. As a result, the blades are guided more firmly, though yieldingly, since the guide bars are drawn together against the blades by their mutual magnetic attraction and thus provide no excessive clearance. In addition, there is also provided a safety factor in that should one of the blades break for any reason, for example because of striking a bone, the magnetic guide structure will tend to attract and hold the broken piece of knife blade and thereby prevent its remaining in the meat.

SHORT DESCRIPTION OF THE DRAWINGS

FIG. 1 is a fragmentary front view, partly in section, of a meat tenderizing machine such as is described and shown in the above-mentioned patent;

FIG. 2 is a fragmentary, enlarged, sectional view on the plane of line 2—2 of FIG. 1 showing the knife blades engaged in the guide grill;

FIG. 3 is a fragmentary view similar to FIG. 1 showing the knives in extended position;

FIG. 4 is an enlarged top plan view of a unit of the novel knife guide structure, the guide bars being shown spaced as they appear when knives are located therebetween;

FIG. 5 is an enlarged, fragmentary sectional view of a guide bar taken on the plane of line 5—5 of FIG. 4; and FIGS. 6, 7 and 8 illustrate in cross-section other shapes of blades.

DESCRIPTION OF A PREFERRED EMBODIMENT

It should me understood that the meat tenderizing machine shown in part in FIGS. 1 and 3 is for illustrative purposes essentially the same as the machine shown and described in the above-mentioned U.S. Pat. No. 3,283,360. Reference to that patent may be made for details of construction not disclosed or shown herein. Further, for convenience of reference, the reference characters used in the patent are given in parentheses immediately following the first mention of the reference characters applied herein to the respective parts.

In FIG. 1 there is shown a portion of a meat tenderizing machine with which the invention of the present application is adapted for use. The machine has a chassis or frame 10 (1) including legs 12 (1a) whereby it may be mounted on a table, bench, counter, or other suitable support. On the upper portion of the frame 10 there is provided a platform 14 having depending guide portions 16 (5) which slidably receive the sleeves 18 that surround the spaced rods 20 (6). The rods 20 are secured at their lower ends, by nuts 22, to a cross bar 24 (7) and are attached at their upper ends to a cross frame member (not shown). The latter is movable upwardly and downwardly along with the rods 20 and the cross bar 24 by means, partially shown and designated 26, actuated by the lever 28 (13). The means 26 includes a rotatable shaft 30 (11) mounted in bearings 32 (12) provided in the frame 10 and additionally supported by a bearing 34 suspended by a hanger 36 from the platform 14.

Above the platform 14 the rods 20 are encircled by compression springs (not shown) which are enclosed by telescoping tubes 38 (21). The springs bear at their lower ends on the platform 14 and support on their upper ends a floating cross member 40 (19) that removably carries a bank 42 (22) of multiblade knives 44 (22a). The blades of the knives 44 are held in proper position and guided by means hereinafter described carried by the stripper plate 46 (35). The plate 46 is attached to vertically movable rods 48 (36) which extend through the floating cross member 40 and are suitably connected to a support (not shown) which permits the plate 46 to hang from the cross member 40. The plate and cross member are, however, adapted and arranged for vertical movement independently of one another.

A cutting board or table 50 (2) is removably carried by the platform 14, as by the cooperating tongues 52 (4) and grooves 54. The board 50 supports the meat during its subjection to the tenderizing operation. Accordingly, it is preferably soft enough not to shatter a knife blade which may accidentally engage it and it should be easily replaceable when it becomes worn or otherwise unsanitary.

Referring to FIG. 2, the bank 42 of knives 44 is removably secured to the floating cross member 40 by a clamp 56 (26) which may be tightened by thumb screws 58 (27). As shown, the base or top portion 64 of each knife 44 is formed with a dove-tail, indicated at 60 (24), at each corner. These dovetails engage, respectively, in complementary notches in the cross member 40 and the clamp 56. The knives are aligned and held together in spaced relation in the knife bank 42 by a removable pin or rod 62 (23) which passes through the base 64 of each of the knives and through spacer blocks 66 (see FIG. 1) inserted between the bases. Depending from the base 64 of each knife 44 are a plurality of regularly spaced blades 68 (22b), preferably sharpened on both their edges and points. The lower ends of the blades 68 are guided and maintained in spaced position by a grill comprehensively designated 70 (33).

The grill 70 is removably carried by the stripper plate 46 which when the machine is in use rests on the meat cut to be tenderized. In comprises a plurality of parallel guide bars 72 (34) arranged (see FIG. 4) in side by side relation and held at one end by rounded projections 74 (34a) on the bars in a carrier 76 (34b) having a laterally and upwardly projecting handle 78 (34c). The plate 46 is provided with a longitudinally extending hole 80 for passage of the knife blades 68, and the hole is provided with longitudinally extending, inwardly directed shoulders 82 and 84 on which the carrier 76 and the free ends of the guide bars 72 carried thereby, respectively, rest. A thumbscrew 86 (34g) holds the carrier 76 against displacement from the plate 46, a notch 88 (34h) (see FIG. 4) being provided in the edge of the carrier for convenient disengagement of the carrier from the thumbscrew. A retainer plate 90 (34h) secured to the stripper plate 46 adjacent the free ends of the bars 72 by a thumbscrew 92 (34i) is provided to maintain the said ends seated on the shoulder 34 of the plate 46.

The guide bars 72, according to the present invention, are of magnetic material, so magnetized that adjacent bars are magnetically attracted one to the other. The location of the magnetic poles is not critical although the arrangement illustrated in FIG. 5 with the plane of polarization running longitudinally of the bars 72 so that the top of each bar constitutes one magnetic pole while the bottom of the bar constitutes the other pole, is usually preferred. As shown in FIG. 5, the poles as indicated by the letters N and S are reversed in alternate bars, thereby causing the bars to be held together by magnetic force. This results in maintaining the blades 68 of each knife 44 straight and aligned, since the bars on either side thereof are pulled together, and maintaining the proper spacing between the blades of adjacent knives. Further, in the event that one of the blades 68 is accidentally broken, for example by striking a bone in the meat, the magnetic attraction of the bars 72 and the knives will tend to pull the broken piece from the meat and hold it, thus preventing danger to the consumer. Although the guide bars 72 may be made of various hard, wear-resistant magnetic materials such as iron-nickel-aluminum-cobalt alloys, steel is satisfactory. Lubrication at the areas of contact between the blades 68 and the bars 72 is provided by the meat juices and fat. It is to be noted that in FIG. 4 the bars 72 are shown in the spaced position they assume when blades 68 are inserted between them. While in general the magnetic poles will be reversed in alternate bars, for convenience in installing or removing groups of bars the adjacent end bars of each group may be so magnetized that there is no mutual attraction.

Although the operation of the meat tenderizing apparatus illustrated herein is fully disclosed in the above-mentioned patent, it may be pointed out that a cut of meat 96 (3) placed on the cutting table 50 is repeatedly pierced by the blades 68 of knives 44 which are moved downwardly through the grill 70 by means (not shown) acting on the cross member 40 from which the knives depend. The platform 14 carrying the table 50 is moved upwardly by means 26 actuated by lever 28 to bring the cut of meat into contact with the stripper plate 46. Thus the meat is held firmly while the blades 68 are withdrawn. As explained above, the guide bars 72 of the grill maintain the blades aligned and in properly spaced position for entry into the meat, the latter being shifted from time to time as operation proceeds whereby to make a plurality of incisions with the blades in different portions of the meat. The magnetic attraction between the bars of the grill holds the blades in position with a firm but yielding force thus preventing the breakage of bent blades which might occur if the guide bars were fixed or rigidly held.

It will be understood that the usefulness of the present invention is not limited to meat tenderizing apparatus constructed and operating as above described. In fact, the novel magnetic guide bars of the present invention can be used not only with thin flat blades of the type illustrated in the above-mentioned patent but also with penetrating elements or blades which have cross-sections of various shapes. For example, the blades may be oval or round, i.e. curved, in cross-section, as shown in FIGS. 6 and 7, or may be round and/or oval in part and flattened in part, as shown in FIG. 8. Further, magnetized guide bars forming a grill may be used as guides and separators for penetrating elements or blades used in any type of mechanical tenderizer. Also, of course, different, suitable mounting arrangements may be provided for the bars if desired or necessary. Thus, although the carrier 76, shown and described above, is relatively short so that a plurality of them are used in providing a grill for a long bank of knives, a single, longer carrier could be employed. On the other hand, shorter carriers may be used when only a few knives or a single knife is employed.

I claim:
1. In apparatus for tenderizing meat by making incisions therein with a reciprocating blade and having a guide bar in contact with said blades to guide the same, the improvement which comprises providing a guide bar of magnetized magnetic material.

2. Apparatus as set forth in claim 1 in which a plurality of parallel guide bars are provided between which a plurality of said blades extend and are guided.

3. Apparatus as set forth in claim 1 in which said blade is flat.

4. Apparatus as set forth in claim 1 in which said blade is curved in cross-section.

5. Apparatus as set forth in claim 1 in which said blade is in part flat and in part curved in cross-section.

6. Apparatus as set forth in claim 2 in which said bars are so magnetized that adjacent bars are magnetically attracted, whereby to exert firm but yielding force on said blades.

7. Apparatus as set forth in claim 6 in which a plurality of said magnetic guide bars are assembled in a grill.

8. Apparatus as set forth in claim 7 in which said grill is removably mounted on said apparatus.

References Cited

UNITED STATES PATENTS

| | | | |
|---|---|---|---|
| 3,283,360 | 11/1966 | Tamain | 17—25 |

FOREIGN PATENTS

| | | | |
|---|---|---|---|
| 1,198,470 | 6/1959 | France | 17—25 |
| 572,133 | 1/1958 | Italy | 17—25 |

LUCIE H. LAUDENSLAGER, Primary Examiner

U.S. Cl. X.R.

146—150, 160